May 14, 1940.  E. W. PATTERSON  2,200,292
GEARED RACK AND PINION
Filed July 16, 1937   4 Sheets-Sheet 1

INVENTOR
EDGAR W. PATTERSON
BY
ATTORNEY

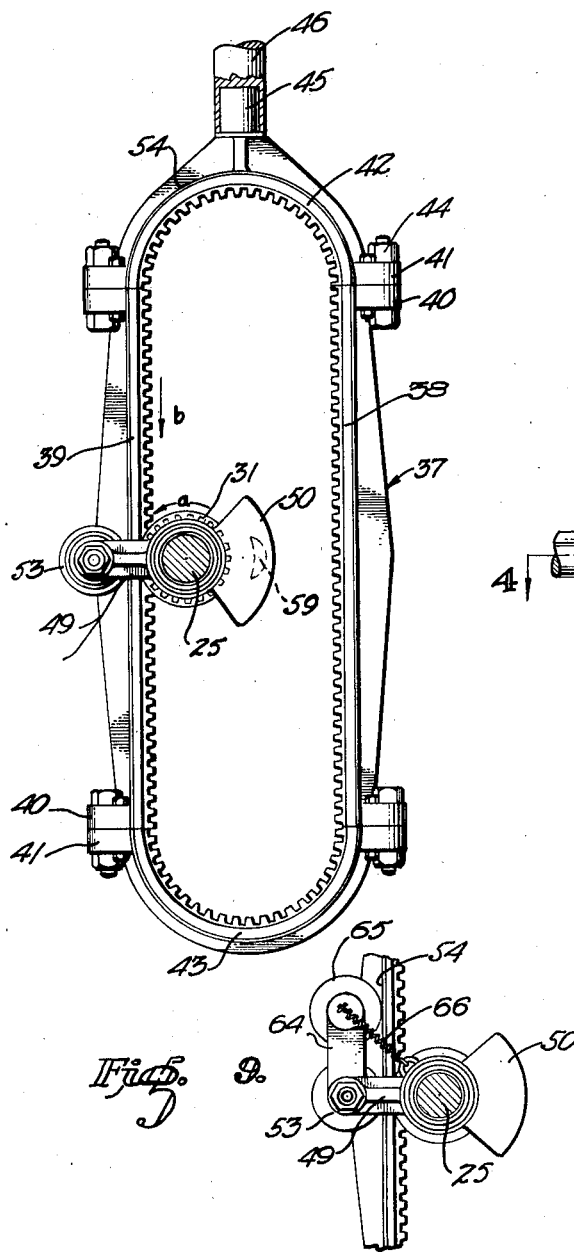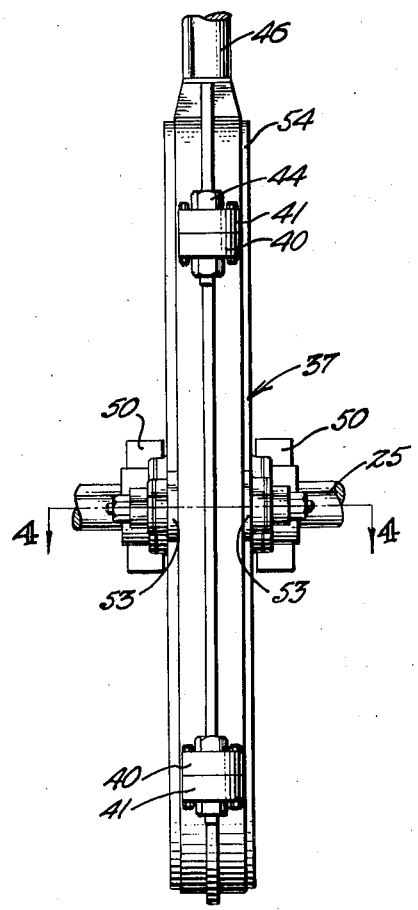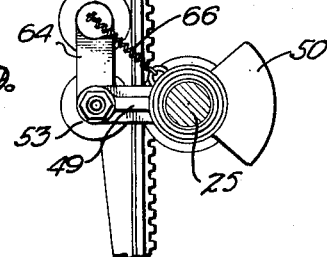

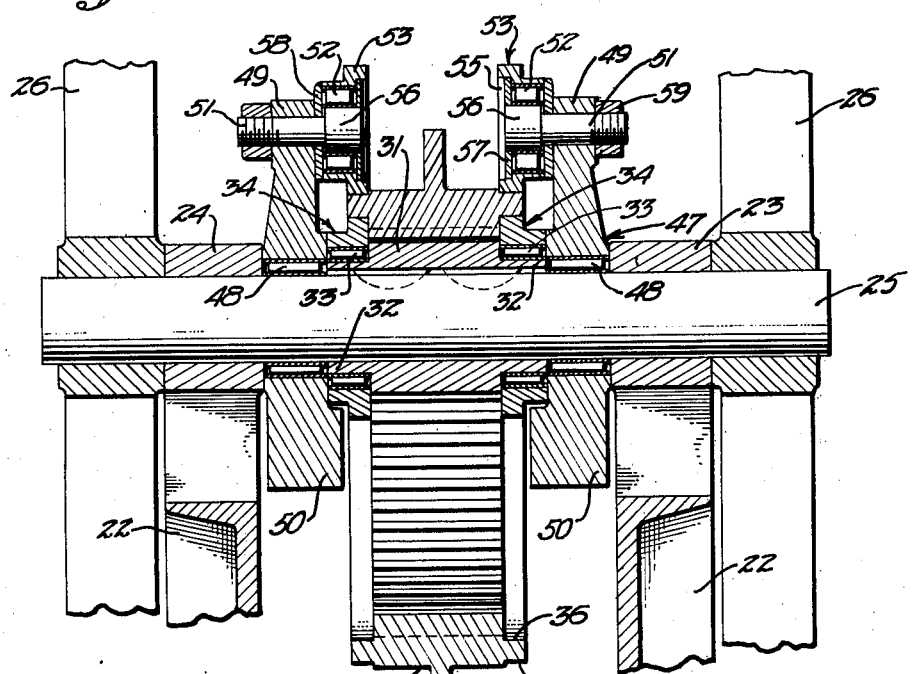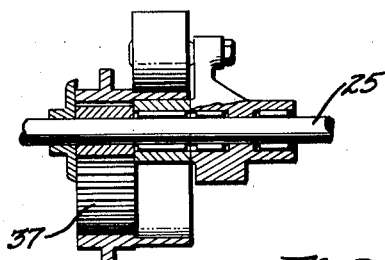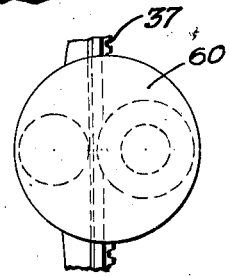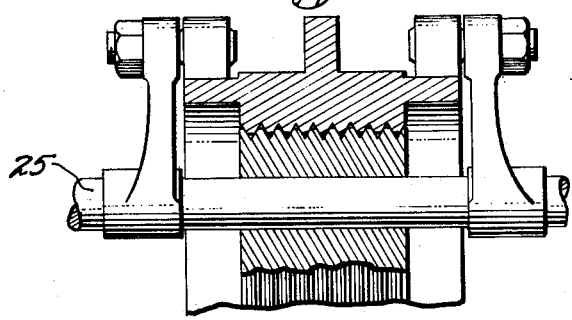

May 14, 1940. E. W. PATTERSON 2,200,292
GEARED RACK AND PINION
Filed July 16, 1937 4 Sheets-Sheet 4
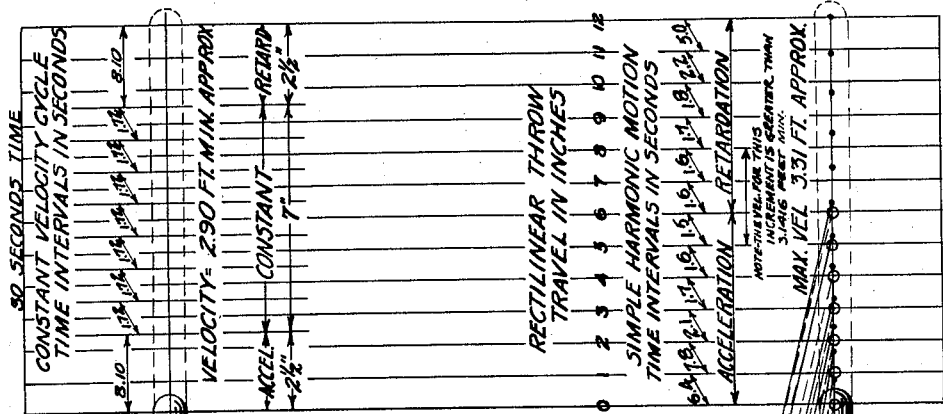
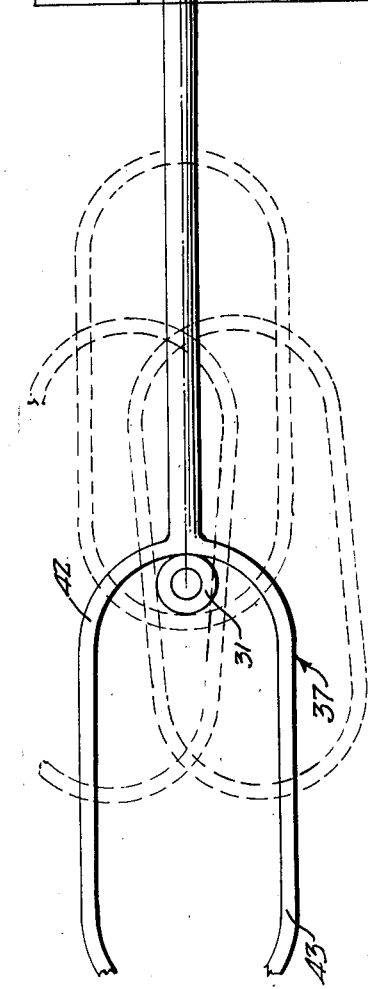
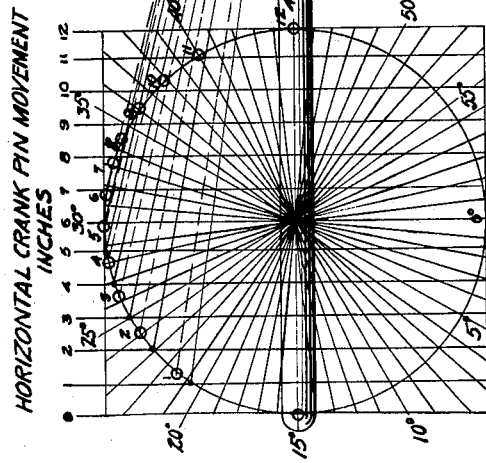
Fig. 5.
INVENTOR
EDGAR W. PATTERSON
BY James M. Abbett
ATTORNEY Patented May 14, 1940

2,200,292

UNITED STATES PATENT OFFICE 2,200,292

GEARED RACK AND PINION

Edgar W. Patterson, Long Beach, Calif., assignor of one-half to C. M. O'Leary, Jr., Los Angeles, Calif.

Application July 16, 1937, Serial No. 154,081

11 Claims. (Cl. 74—41)

This invention relates to mechanical movement, and particularly pertains to a geared rack and pinion.

In the operation of various mechanical structures it is desirable to impart uniform linear motion to a member as derived from a continuously rotating element, and to insure that the rotating element will be subjected to a substantially constant torque load while the linear motion will be at a substantially constant rate without acceleration or retardation. Such operation is desirable, particularly in connection with well pumping mechanisms and machine tools, such as shapers or planers, wherein a constant velocity for the cutting tool is desired. In such structures a rotary driving action is usually produced by a crank throw which moves around a fixed rotary axis and which is driven by a suitable prime mover. A pitman rod connects the crank with the cross head or walking beam and due to the inherent operation of the crank the motion imparted to the walking beam or cross head will be recurrently accelerated and retarded throughout the driving cycle. This motion is commonly termed "simple harmonic motion." This imposes varying conditions of torque load upon the prime mover. It is the principal object of the present invention therefore to provide a power translating device which may be driven by a prime mover acting to impart constant rotation to a rotary element and which rotary element drives a geared rack to translate the rotary movement into a linear movement acting at a constant driving rate to impart a substantially constant velocity oscillating motion to a pump walking beam, or like element, or a substantially constant velocity to a cross head, and which motion will be at a constant rate of speed throughout the oscillation of the beam or travel of the cross head irrespective of the direction in which the beam is swinging, or cross head is moving, thereby insuring that a constant torque load will be imposed upon the prime mover.

The present invention contemplates the provision of a rotary gear in mesh with a continuous floating internal gear rack, the gear rack being provided with cooperating means whereby said elements will be maintained in proper driving relationship through the entire cycle of operation of the mechanical movement.

The invention is illustrated by way of example in the accompanying drawings in which:

Fig. 2 is an enlarged view in side elevation showing the elements of the mechanical movement.

Fig. 3 is an enlarged view in end elevation showing the elements of the mechanical movement and their relationship to each other.

Fig. 4 is an enlarged view in transverse section, as seen through the mechanical structure as viewed on the lines 4—4 of Fig. 3.

Fig. 5 is a chart indicating the acceleration and retardation showing the usual high velocity produced by a crank operated mechanism, and the acceleration constant velocity, and retardation, occurring in the use of the present invention.

Fig. 7 is a fragmentary view showing another form of the invention disclosing the manner in which the rack and the pinion are held in engaging positions.

Fig. 8 is a fragmentary view showing a form of the invention in which a pair of disc elements acts to maintain the rack and pinion in proper relationship laterally.

Fig. 9 is a fragmentary view showing the use of a follower member with the rack and the pinion.

Fig. 10 is a detail, sectional view showing the use of a disc at one side of the rack and an arm at the opposite side thereof.

Fig. 11 is a fragmentary view in section showing a modified form of the invention.

Figure 1:
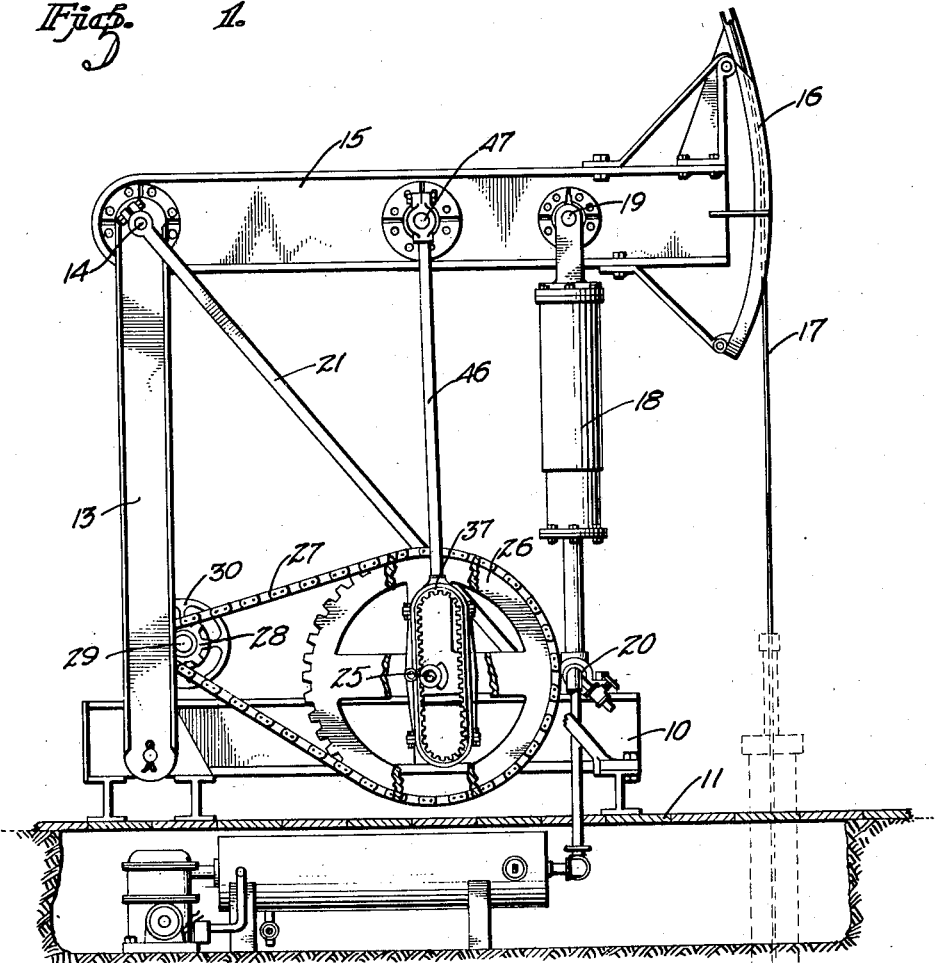
Figure 1 is a view in side elevation with parts broken away showing the application of the mechanical movement to a well pumping mechanism.

In referring to the drawings it is to be understood that while the invention is here disclosed as being particularly applicable to pumping mechanism, such as is used in connection with oil wells, and in which case it is desirable to maintain a substantially constant velocity stroke without acceleration or retardation, the present invention may also be used as a mechanical driving means for other types of mechanism, and also in cases where a controlled amount of acceleration and retardation are desirable during the operating cycles of the mechanism.

Referring particularly to Fig. 1 of the drawings, the invention is disclosed applied to a well pumping mechanism of the general type illustrated in my patent entitled Well pump operating mechanism, which eventuated as Reissue Patent No. 20,287. In the drawings 10 indicates the frame structure for a pumping unit, the structure being mounted upon the floor 11 adjacent to a well 12. Extending vertically from the frame 10 is a Samson-post 13 which is provided with a pin bearing 14 at its upper end to pivot a walking beam 15. The free end of the walking beam carries a circular segment 16 provided with reins 17 which connect with the polished rod of the pump. As here shown a suitable counterbalance cylinder 18 is interposed between the free end of the walking beam 15 and the frame 10, it being pivoted to the walking beam on a pin 19 and to the frame in a bearing 20. Suitable brace members 21 hold the Samson-post in a rigid vertical position. The upper portion of the frame 10 is formed by a pair of structural elements 22 of channel or I beam section which are spaced from each other and which as shown in Fig. 4 carry bearings 23 and 24. These bearings rotatably support a shaft 25 which is here disclosed as carrying a pair of sprocket wheels 26 upon its opposite ends. It is to be understood, however, that belt wheels might be used and that in some instances only one of these members is necessary. The wheels 26 are fitted with a flexible driving element 27 which leads around a suitable driving member 28 carried upon the shaft 29 by a source of power, such as an electric motor 30. Mounted upon the shaft 25 and centrally of its length is a gear pinion 31. This pinion is keyed on to the shaft 25 and is fitted at its opposite ends with reduced hubs 32. These hubs form a support for anti-friction bearings 33 which are disposed therearound over which rollers 34 are mounted, one of these rollers being upon each end of the gear 31, and each of which rests against a guide track 36 formed along opposite marginal edges of an endless gear rack 37. This gear rack, as particularly shown in Fig. 2 of the drawings, comprises two straight sections 38 and 39 which are in spaced parallel relation to each other. They are formed at their opposite ends with bolting lugs 40 against which bolting lugs 41 of semicircular rack segments 42 and 43 are fastened by bolts 44. The rack segments 42 and 43 are semi-circular having an internal gear cut around the arcuate face thereof. In fact, in the manufacture of the endless gear rack 37 it has been found desirable to initially form the members 42 and 43 in one piece and to cut a circular internal gear thereon, after which the structure is split in two pieces to form the semicircular segments 42 and 43 which are bolted at opposite ends of the intermediate rack sections 38 and 39. The internal pitch diameter of the circular gear thus cut represents the distance between the pitch lines of the rack sections 38 and 39. This diameter bears a definite ratio to the pitch diameter of the pinion 31 for a purpose to be hereinafter described. The upper gear segment 42 is provided with an extension 45, the longitudinal center of which lies along the longitudinal center of the complete structure and receives the lower end of a pitman rod 46 which is pivoted at 47 to the walking beam 15, or the slidable cross head.

Figure 6:
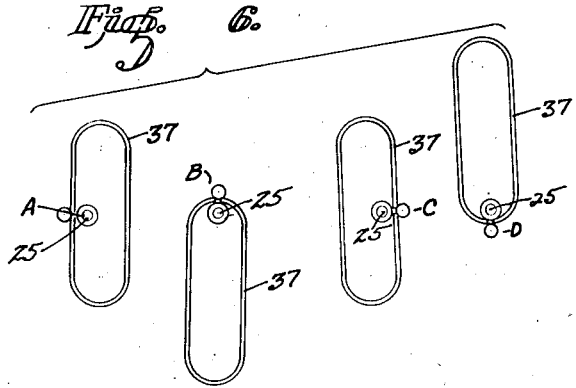
Fig. 6 is a series of diagrams showing the gear unit in different positions of its operating cycle.

Freely mounted upon the shaft 25 at points between the ends of the gear 31 with its rollers 34 and the bearings 23 are floating arms 47. These arms are mounted on anti-friction bearings 48, and as shown in Figs. 2 and 4 comprise a radial arm section 49 and a counterweight 50 disposed on the diametrically opposite side of its rotating axis. Mounted at the free ends of each of arm sections 49 is a spindle 51 receiving anti-friction bearings 52 upon which guide rollers 53 are mounted. These rollers, as particularly shown in Fig. 4 of the drawings, engage a guide face 54 at opposite sides of the rack 37 and parallel to the guide faces 36 previously described, as being engaged by rollers 34. Thus the rollers 34 and 53 hold the gear rack 37 in fixed spaced relation to the gear 31 and act to guide the gear rack and to maintain it in mesh with the gear 31 through the entire cycle of operation of this gear mechanism, as indicated in Fig. 6 of the drawings. The rollers 53 are cup-shaped and are held in position by virtue of an enlarged disc-shaped head 55 on the innermost ends of each of the spindles 51. An intermediate portion 56 provides a support for the anti-friction bearings 52. Suitable thrust discs 57 and 58 are also provided upon the spindles 51 to maintain the rollers 53 in a free rotating condition. Nuts 59 are threaded on to the small outer ends of the spindles to hold the spindles in position.

In the form of the invention shown in Fig. 4 of the drawings the arm structures 47 are shown as free and separate. As indicated at 59 in Fig. 2 of the drawings a web or shaft is shown as cross-connecting the counterweight portions 50 of the members 47. In any event the arms will adapt themselves freely to the concentric and parallel guide surfaces 36 and 54 as the endless rack 37 is driven by the pinion 31. In some forms of the invention it may be desirable to steady the endless gear rack 37 against lateral movement with relation to the gear 31, and in such instances the freely floating arm structure 47 carrying the rollers 53 may be used at one side of the rack with a disc at the opposite side of the rack, as in Figure 10, or said arm structure may be in the form of a disc as indicated at 60 in Fig. 8. These discs will lie on opposing sides of the endless gear rack 37 and the edges of the rack will substantially contact the opposed faces of the discs so that any tendency for lateral displacement of the gear rack 37 will be restrained. It may also be desirable to provide a structure as indicated in Fig. 7, where it will be seen that the gear rack is formed with continuous concentric and parallel channels 61 in its opposite faces which receive rollers 62 and 63 carried by the arms 49', or one roller mounted on each arm having a diameter substantially the width of channel 61.

In the form of the device shown in Fig. 9 of the drawings the arms 49 are provided with shackles 64 which carry follower rollers 65 moving along the same path as the rollers 53. Tension springs 66 hold the follower rollers in contact with the guide surface 54 so that undue vibration will not take place between the parts.

In operation of the present invention reference will be first made to the mechanical movement as disclosed particularly in Figs. 2 and 4. Here it will be seen that the shaft 25 is rotatably supported in fixed bearings 23 and that the shaft rotates in the direction of the arrow a as indicated in Fig. 2. When thus being driven the gear 31 will move the rack section downwardly in the direction of the arrow b from the position indicated at A in Fig. 6 toward the position indicated at B in Fig. 6. As the gear pinion 31 engages the teeth of the upper segment 42 the arms 49 carrying the rollers 53 will swing around and along the concentric and parallel guide face 54 since the axes of the shaft 25 and the rollers 53 are in fixed relation to each other and they will assume a position represented by the shortest distance between these two points at all times, which is always at right angles to the pitch line of the rack and always radially through the point of contact between the pinion 31 and the semicircular segments 42 and 43, irrespective of the fact that the gear rack is interposed between pinion 31 and the rollers 53. This will cause the gear rack structure to shift longitudinally and since the teeth of the pinion and the rack are volute in form the driving operation will be continued without a binding of the parts since rollers 34 hold racks 38 and 39 and segments 42 and 43 in fixed relation and proper alignment with pinion 31 and shaft 25. When the radial center of the segment 42 is in the same intersecting plane as that occupied by the rotary axis of the drive shaft 25 and the guide rollers 34 and 53, the gear structure 37 will be at the end of its stroke, as indicated at B in Fig. 6. As the driving action continues the opposite quadrant of the gear 42 will be engaged by the pinion 31 and the gear rack 37 will begin an upward movement from the position indicated at B in Fig. 6, toward the position indicated at C in the same figure, and as this driving action continues the remaining length of the straight rack section 38 and the arcuate segment 42 will be moved and driven by the pinion 31 until the opposite end of the stroke is reached, as indicated at D in Fig. 6, and the cycle is completed to the position indicated at A in that figure. It will be evident that due to the guide arrangement afforded by the rollers 34 and 53 and their supporting elements, such as the arms 49, as shown in Figs. 2 and 4, the arms 49 as shown in Fig. 7, and the discs 60 as shown in Fig. 8, the rack teeth and the pinion teeth will be maintained at all times in their proper driving relationship. The driving action taking place between the pinion and the rack will also act to move the rollers 53 so that they will automatically adjust themselves to the proper position on the outer concentric and parallel guide surface 54 whether the driving action is taking place between the pinion and the straight rack sections 38 and 39 or the arcuate sections 42 and 43.

Attention is directed to the fact that the arcuate length of the pitch of the rack teeth of the segments 42 and 43 bear a definite relationship to the pitch diameter of the gear 31. In the present instance this relationship is such as to insure that the lineal travel of the entire rack unit 37 while the gear pinion moves from an end of one of the straight racks 39 to a contiguous end of a straight rack 38, will be uniform in speed with the lineal travel of the rack structure 37 while the gear 31 and the straight rack sections are in driving relationship. This insures that the driving speed and the rate imparted to a mechanism by movement of the gear rack 37 will be uniform in speed from the time the pinion 31 leaves the segment 42 until the pinion comes in contact with segment 43.

Referring particularly to the graphs shown in Fig. 5 of the drawings, the comparative performance and operation of the present invention and a crank pin structure are disclosed. The gear structure with which the present invention is concerned is shown as having a relative constant velocity driving period throughout a considerable length of its stroke. This length is represented by the length of the straight rack portions of the gear rack 37 as driven by the pinion 31. It will be seen that there are relatively short periods of retardation as represented by the time required for the gear pinion 31 to traverse the semi-circular arc represented by the end portions 42 and 43 of the rack. A careful consideration of the gear rack structure will show that the driven action produced by the crank pin and the pitman rod will be always in acceleration or retardation as compared with the intermediate periods of uniform movement produced by the structure with which the present invention is concerned. The legends appearing upon the graphs in Fig. 5 clearly explain the relative performances of the two structures.

It will be evident that while the gear mechanism, as shown in Fig. 2 of the drawings, is designed to produce uniform driving momentum, and thus a constant velocity load on the drive shaft 25, a change in ratio between the arcuate gear segments and the driving gear might be made to produce any desired ratio of acceleration and retardation during the cycle of operation of the gear.

In the specific application of the gear structure embodying the present invention, in a well pumping mechanism, it will be seen that material advantages are obtained since the gear ratios may be so selected as to insure that a substantially constant torque will be applied to the driving shaft 25 and that a most constant velocity will be imposed upon the driven rack structure 37. In operation it has demonstrated that the velocity of the walking beam 15 will be constant during approximately 70% of both of its oscillating strokes and that the pumping mechanism will therefore be driven at a nearly constant velocity from one end of the pumping stroke to the other without acceleration or retardation in movement. This insures that a uniform load will be imposed on the driving unit at all times and that due to the constant load the entire structure will operate without excessive wear, vibration, or strain. It is understood that the mechanism here described may be frictionally driven in place of gears and pinion as per Figure 11, or by flat frictional surface, using only the arm 49 and roller 53 and eliminating rollers 34.

With the device as disclosed herein it is possible to develop linear travel of 200 feet per minute i. e. (or 25 four foot strokes) with a maximum velocity of 275 feet per minute, as compared to approximately 330 feet per minute velocity for the crank motion type of "simple harmonic motion." This is very desirable in machine tools wherein the cutting speed of a tool is limited definitely within fixed limits, whereby applicant's device makes it possible to develop a much greater cutting tool travel per minute with the same maximum velocity as crank motion.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A mechanical movement for translating a rotary driving action to a rectilinear driven action which comprises a rotatable drive shaft mounted in fixed bearings, a driving pinion fixed upon said shaft, a driven gear rack encircling said pinion and having an inner gear in constant mesh with the pinion, a pair of inner and outer guide surfaces upon the rack and in opposition to each other at each side of the rack gear while conforming to the configuration of the rack, freely rotatable guide rollers having an axis common to the drive shaft and engaging the inner guide surfaces to limit the depth of mesh of the teeth of the rack gear and pinion, freely rotatable arms having a rotating axis common with the axis of the drive shaft at opposite sides of the rack, and guide rollers freely rotatable upon the free ends of said arms and engaging the outer guide surfaces of the rack to maintain the rack and pinion in constant uniform mesh.

2. A mechanical movement for translating a rotary driving action to a rectilinear driven action comprising, a drive shaft, a driving pinion fixed upon said drive shaft, an endless rack having the inner surface of its side and end walls formed with gear teeth adapted to mesh with said driving pinion, said rack being mounted to move in a plane at right angles to the axis of said drive pinion and having at opposite sides of its gear teeth inwardly and outwardly facing parallel guide surfaces, floating arms mounted on said drive shaft to rotate around the axis thereof at opposite sides of the rack, and guide means carried by said floating arms and engaging said inner and outer guide surfaces of said rack so as to maintain the pinion and rack in constant uniform mesh.

3. A mechanical movement for translating a rotary driving action to a rectilinear driven action, which comprises a drive shaft, a pinion fixed upon said drive shaft, an endless gear rack comprising opposite parallel sides and semi-circular connecting end portions, said rack being mounted to move in a plane at right angles to the axis of said pinion, and having a continuous inner toothed portion in engagement with said pinion and walls providing guide surfaces on the opposite sides of said toothed portion, a floating disc at each side of said rack mounted upon said drive shaft to rotate around the axis thereof, and guide means carried by said floating discs and engaging said guide surfaces so as to maintain said pinion and said rack in constant driving relationship.

4. A mechanical movement for translating a rotary driving action to a rectilinear action, which comprises a drive shaft, a driving pinion fixed on said drive shaft, an endless gear rack in engagement with said pinion and having opposite parallel sides and semi-circular connecting end portions, said rack having inner and outer guide surfaces extending continuously around opposite sides thereof, floating arms mounted on said drive shaft to rotate around the axis thereof at opposite sides of the rack, connections between said arms constraining the same to simultaneous movement, and guide means carried by said floating arms and engaging said guide surfaces so as to maintain said pinion and said rack in constant driving relationship.

5. A mechanical movement for translating a rotary driving action to a rectilinear driven action, which comprises a drive shaft, a driving pinion fixed upon said drive shaft, an endless gear rack comprising opposite parallel sides and semi-circular connecting end portions, said rack being mounted to move in a plane at right angles to the axis of said driving pinion and having an inner gear engaging the pinion, and guide faces at its opposite edges, a pair of floating arms mounted on said drive shaft to rotate around the axis thereof at opposite sides of the rack, means rigidly connecting said arms, and cooperating means between said arms and the edge faces of said gear rack for positively maintaining said gear rack and said pinion in fixed spaced relation to each other as they move.

6. A mechanical movement for translating a rotary driving action to a rectilinear driven action, which comprises a drive shaft, a driving pinion fixed upon said drive shaft, an endless gear rack comprising opposite parallel sides and semi-circular connecting ends portions, said rack being mounted to move in a plane at right angles to the axis of said driving pinion, floating arms mounted upon said drive shaft to rotate around the axis thereof, walls providing guide surfaces on the inner and outer parts of said rack, guide means carried by said arms and engaging said guide surfaces so as to maintain said pinion and said rack in constant driving relation, trailing rollers mounted on said arms and moving along the outer guide surface of said rack, and yielding means acting to hold said trailing rollers in contact with said outer guide surfaces.

7. A mechanical movement for translating a rotary driving action to a rectilinear driven action, which comprises a drive shaft, a driving pinion mounted on said drive shaft, an endless gear rack comprising opposite parallel sides and semi-circular connecting end portions, said rack circumscribing said pinion and being in driving engagement therewith, walls providing guide flanges extending laterally from said rack at its opposite sides, rollers freely rotatable on said shaft and engaging the inner surfaces of said guide flanges, freely swinging arms on said shaft outstanding therefrom at the sides of said flanges, rollers freely mounted on said arms and engaging the outer surfaces of said guide flanges, and means connecting said arms inwardly beyond the shaft.

8. A mechanical movement for translating a rotary driving action to a rectilinear driven action comprising, a drive shaft, a driving pinion mounted on said drive shaft, an endless gear rack adapted to mesh with said driving pinion, walls providing guide surfaces on the inner and outer parts of said gear rack, a roller freely rotatable on said shaft and engaging the inner guide surface, a freely swinging arm on said shaft, a roller freely mounted on said arm and engaging said outer surface of said rack, and weight means for holding said guide rollers in engagement with said guide surfaces.

9. Gearing including a drive shaft, a driving pinion fixed thereon, a rack around the pinion and having a continuous internal gear in engagement with said pinion, said rack having a pair of inner and outer guide surfaces at each side of its internal gear, and means supported by said shaft and in rolling contact with both pairs of said guide surfaces for maintaining the rack and pinion constantly and uniformly in mesh of a predetermined depth, said means including roller supporting members rotatably in connection with, and supported by, the shaft at opposite sides of the rack, rollers supported by said members outwardly of the rack and engaging the outer guide surfaces, and a rigid connection between said members inwardly of the rack for insuring uniform movements of said members with respect to the shaft.

10. Gearing including a rack member having a continuous internal gear, a driving pinion within said rack member in engagement with the gear thereof, a shaft on which said driving pinion is fixed, said rack member having inner guide tracks at opposite sides of the gear thereof, arranged in parallel relation with the rack member entirely therearound and positioned at the pitch line of the rack gear, and outer guide tracks also at opposite sides of its gear, paralleling the inner guide tracks entirely therearound, free moving arms carried by the drive shaft at opposite sides of the rack member, means mounted on said arms and in rolling contact with the outer guide tracks for maintaining the pinion and rack gear in mesh and preventing their disengagement, and means carried by the shaft in rolling contact with the inner guide tracks, serving to limit the engagement of the pinion with the rack gear and maintain a predetermined depth of mesh therebetween.

11. Gearing including a rack member having a continuous internal gear, a driving pinion within said rack member in engagement with the gear thereof, a shaft on which said driving pinion is fixed, said rack member having inner guide tracks at opposite sides of the gear thereof, arranged in parallel relation with the rack member entirely therearound and positioned at the pitch line of the rack gear, and outer guide tracks also at opposite sides of its gear, paralleling the inner guide tracks entirely therearound, free moving arms carried by the drive shaft at opposite sides of the rack member, means mounted on said arms and in rolling contact with the outer guide tracks for maintaining the pinion and rack gear in mesh and preventing their disengagement, means carried by the shaft in rolling contact with the inner guide tracks, serving to limit the engagement of the pinion with the rack gear and maintain a predetermined depth of mesh therebetween, and means rigidly connecting said free moving arms for insuring their movement in unison.

EDGAR W. PATTERSON.